UNITED STATES PATENT OFFICE.

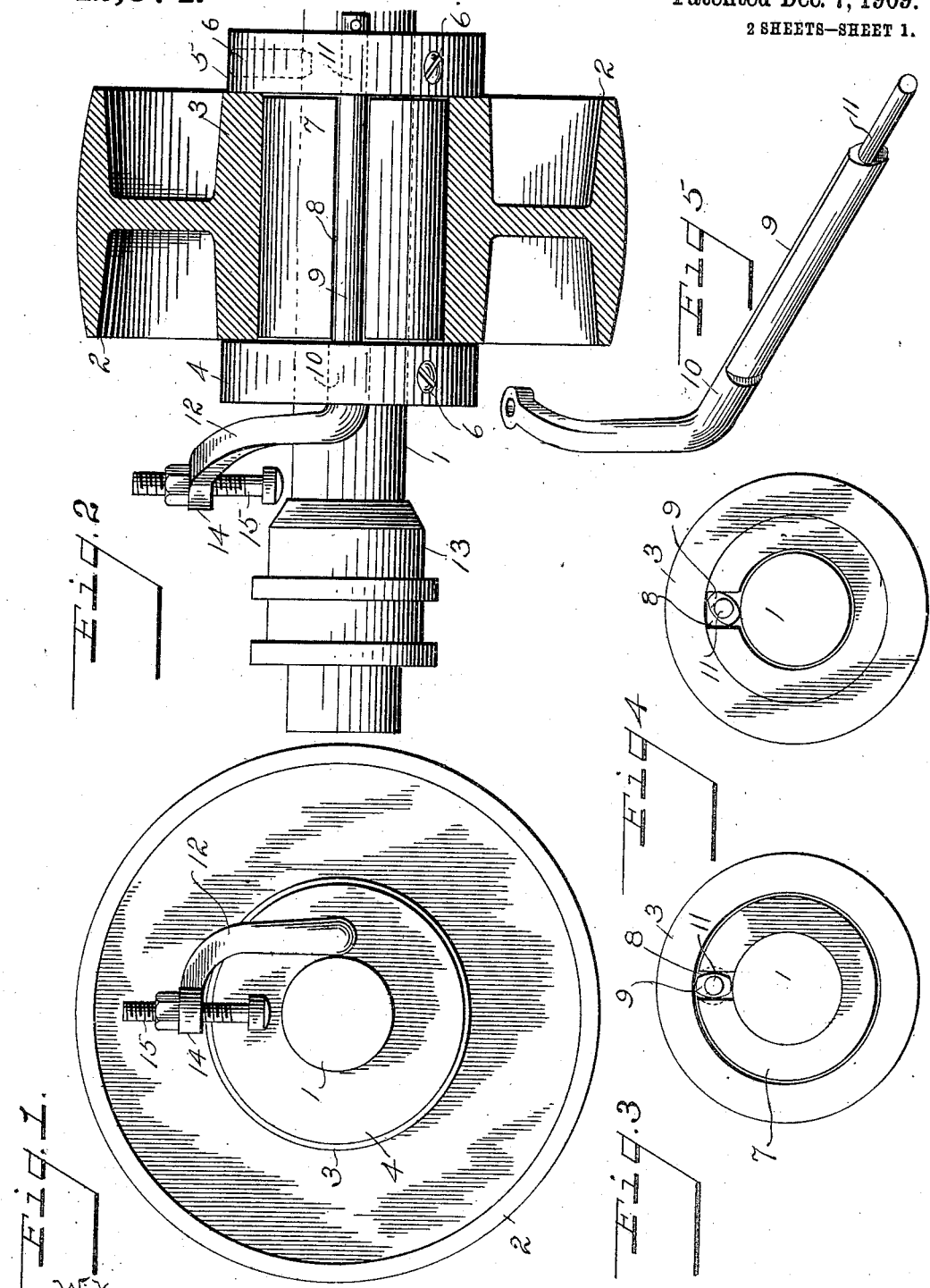

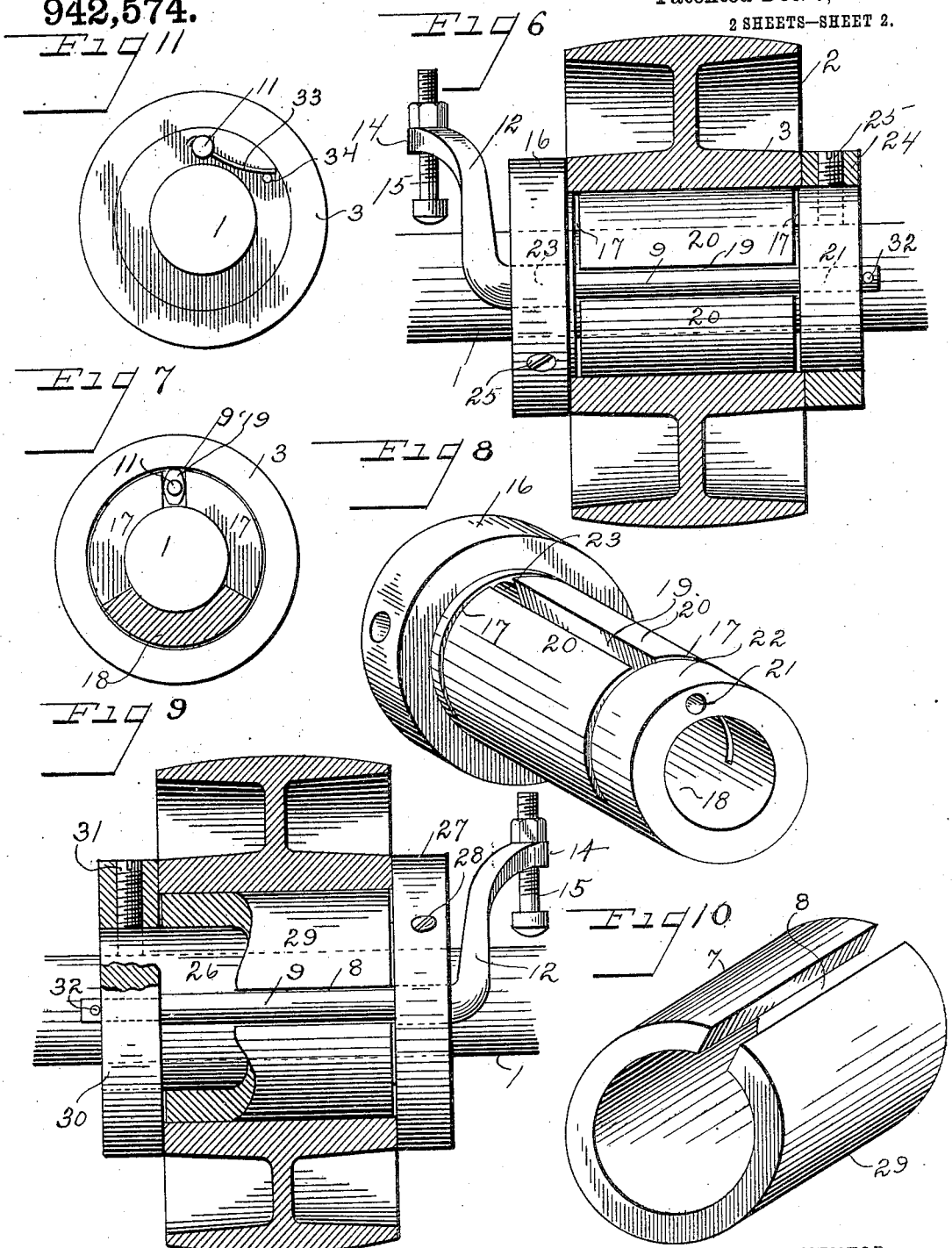

AMOS LINT, OF DAYTON, OHIO, ASSIGNOR OF ONE-HALF TO DAVID P. CLARK, OF DAYTON, OHIO.

FRICTION-CLUTCH.

942,574.  Specification of Letters Patent.  Patented Dec. 7, 1909.

Application filed April 2, 1908. Serial No. 424,697.

*To all whom it may concern:*

Be it known that I, AMOS LINT, a citizen of the United States, residing at Dayton, in the county of Montgomery and State of Ohio, have invented certain new and useful Improvements in Friction-Clutches, of which the following is a specification.

My invention relates to clutches and particularly to friction clutches, adapted for use with light running machinery, but capable of being constructed of proportions suitable for heavy work.

The object of the invention is to greatly simplify the construction as well as the means and mode of operation of such devices whereby they will not only be cheapened in construction but will be rendered more efficient in operation, easily operated, and unlikely to get out of repair.

A further primary object is to provide a clutch which will be compact, adapted to use on small machines where but limited room is available, and in which the frictional engagement of the clutch parts will be in a plane common with the application of power, and furthermore one adapted to be engaged at any point of rotation with a minimum movement of the parts.

With the above primary and other incidental objects in view as will more fully appear from the specification, the invention consists of the means, mechanism, construction, and mode of operation or their equivalents, hereinafter described and set forth in the claims.

In the drawings Figure 1 is an end elevation of the assembled device. Fig. 2 is a longitudinal sectional view of the assembled clutch. Figs. 3 and 4 are detail end views of the clutch parts in inoperative and operated positions. Fig. 5 is a perspective view of the oscillatory operating rod. Fig. 6 is a longitudinal sectional view of a modified form of clutch, embodying similar features of the invention. Figs. 7 and 8 are respectively a cross sectional view of the parts, and a detail perspective view of the sleeve, employed in the construction shown in Fig. 6. Fig. 9 is a further modification of the clutch mechanism, and Fig. 10 is a perspective view of the clutch or friction sleeve employed in the constructions shown in Figs. 2 and 9. Fig. 11 is an end view of the assembled parts, being the side opposite the operating cone, and showing a spring for returning the oscillatory operating rod to normal.

Like parts are indicated by similar characters of reference throughout the several views.

Referring to the drawings, particularly to sheet one thereof, 1 is the shaft, 2 is a pulley of which 3 is the hub having a smooth straight bore concentric with the rim, and also with the shaft 1. It is obvious that in place of the pulley 2 a gear wheel, pinion or other machine part may be substituted.

Two collars 4 and 5 are secured to the shaft 1 by set screws 6, or other means, whereby they will revolve with the shaft. The collars 4 and 5 are located on opposite sides of the pulley 2 and limit the lateral movement thereof. Located in the smooth bore of the hub 3 and surrounding the shaft 1 intermediate the collars 4 and 5 is a sleeve 7 having a longitudinal slot therein, as at 8. The formation of the sleeve 7 is best shown in Fig. 10. The sleeve 7 forms a journal on which the pulley 2 normally rotates freely. An expanding rod 9 extends throughout the slot 8 of the sleeve 7, and is formed with trunnions or bearings 10 and 11 journaled in the respective collars 4 and 5. That portion of the expanding-rod within the slot 8 is preferably non-circular in cross section, and is so mounted that the rocking or oscillation of the rod about its longitudinal axis will cause the same to engage the adjacent edges of the split sleeve 7 and expand that sleeve into frictional engagement with the bore or bearing surface of the hub 3. A rock arm 12 is provided whereby the expanding-rod 9 may be oscillated in its bearings. The arm 12 may be formed independent of the rod 9 and attached thereto, but is preferably formed integral therewith by bending a portion of the rod projecting beyond the collar 4 at substantially right angles to the main portion, as shown in the drawings. A cone 13 longitudinally movable on the shaft 1, and operated in the usual manner is provided to oscillate the rod 9 by engagement with the arm 12.

While the operation of the parts may be by direct contact of the cone 13 and arm 12, a head 14 is preferably formed on the arm 12, through which extends an adjustable stud 15, to be engaged by the cone 13 to operate the parts.

The normal position of the parts is shown in Fig. 3, the expanding-rod 9 being shown in normal position within the slot 8 of the sleeve 7, and the pulley 2 free to rotate on the sleeve 7. Upon oscillation of the rod 9 by the engagement of the cone 13 with the arm 12, through the stud 14, the rod 9 by bearing upon the adjacent sides of the slot 8 will expand the sleeve 7 to frictionally engage the interior of the bore of the hub 3, whereby the pulley, sleeve and shaft will rotate in unison. The driving engagement between the driving and driven members comprises the frictional engagement of the expanded sleeve 7 with the interior of the hub 3, the engagement of the sleeve 7 with the rod 9, which is journaled in the collars 4 and 5 secured by the set screws 6 upon the shaft 1. The sleeve 7 is free upon the shaft 1 except through the engagement with the rod 9. When operated the sleeve 7 will frictionally engage the hub 3 throughout substantially the entire inner periphery thereof, except the space intermediate the edges of the slot 8. The construction described affords a maximum amount of frictional surface, thereby requiring but slight pressure to maintain the frictional engagement of the parts, furthermore the frictional engagement is in a direct or common plane with the pull of the driver, and extends throughout the full length of the hub 3.

In Figs. 6, 7 and 8 is illustrated a modification, in which the shaft 1, the pulley 2 and hub 3, the expanding-rod 9, arm 12 and cone 13 are all constructed as before described. The variation of the structure relates to the sleeve on which the pulley is mounted, and which is illustrated in Fig. 8. The sleeve 15 is mounted on the shaft 1, and forms the journal for the pulley. Adjacent to one end of the sleeve 15 is an integral flange or collar 16, adapted to limit the lateral movement of the pulley in one direction. In the reduced or journal portion of the sleeve 15 are two transverse slots or cuts 17 extending partly around the sleeve, but leaving a portion of the sleeve intermediate the ends of the cut 17 integral as at 18. The transverse cuts 17 are connected by a slot 19 extending longitudinally in said sleeve, at a point substantially opposite the uncut portion 18, although not necessarily so located. The combination of the transverse cuts 17 and the longitudinal slot 19 forms in the journal portion of the sleeve two peripheral tongues 20 adapted to be expanded within the hub of the pulley, by the oscillation of the expanding-rod 9 which extends through the longitudinal slot 19 and is provided with bearings 21 in the uncut portion 22 of the sleeve, and a bearing 23 in the flange portion 16, as indicated. A removable collar 24 is secured on the portion 22 of the sleeve by set screws 25 which preferably extend through the sleeve 15 into engagement with the shaft 1. Similar set screws extend through the flange 16 into engagement with the shaft to secure the sleeve thereon. It is obvious that the sleeve might be secured upon the shaft by a key or other ordinary means. Upon the oscillation of the expanding-rod 9 by the action of the cone 13 before described, the peripheral tongues will be forced outward, or the sleeve expanded, to frictionally engage the interior of the hub 3 of the pulley. While the frictional engagement will not in this case extend entirely around the inner periphery of the hub, the engagement will be upon a very considerable surface, and will be throughout the full length of the hub.

The modification shown in Fig. 9 is substantially a combination of the two structures before mentioned. The shaft, pulley, oscillating rod and operating means are the same as before described. Mounted on the shaft is a sleeve, comprising a reduced portion or main portion 26 and an integral flange 27. In shape the sleeve is the same as employed in the structure of Fig. 6 and illustrated in Fig. 8, except it is a plain sleeve without the cuts and slot 17 and 19. The sleeve is secured upon the shaft by set-screws 28. Mounted on the sleeve and within the hub of the pulley, for which it forms a journal, is an expansible sleeve 29, similar to that employed in the structure of Fig. 1, and illustrated in Fig. 10. Secured to the sleeve 26 beyond the hub of the pulley is a collar 30, held in place by set screws 31 which preferably project through the sleeve 26 into the shaft 1. The expanding-rod 9 is journaled in the flange portion 27 of the sleeve and the collar 30, as indicated in Fig. 9, and is operated in the same manner as before described. Upon oscillation of the expanding-rod 9, which extends through the slot 8 of the expansible sleeve, said sleeve is expanded to frictionally engage the interior surface of the hub as described, in connection with Fig. 1. The advantages of the modifications Figs. 6 and 9 over the structure of Fig. 1 is that they may be assembled in the factory at the time of manufacture, and adjusted to the shaft in an assembled condition, whereas the structure of Fig. 1 must be assembled at the time of adjustment to the shaft.

In each of the structures described, a pin or cotter 32 is located in the extremity of the rod 12 to prevent longitudinal movement of the rod. However in place of the cotter or pin, 32 a piece of spring wire 33 is preferably projected through the rod as best shown in Fig. 11, to limit the movement thereof, the said spring wire being under tension, and engaging a pin 34 in the supporting collar, whereby the spring will tend to return the rod 9 to normal position, and hold it so, after the arm 12 has been disengaged by the cone 13. Ordinarily the use of this returning spring will not be necessary, however if the clutch happens to stop in certain positions, the weight of the arm 12 will tend to oscillate the rod 9, to cause a slight frictional engagement of the parts, which while not sufficient to form a driving connection, might be sufficient to cause undue wear upon the parts.

It will be noted that in each of the above described constructions, the frictional engagement of the parts is in a common plane with the pull of the driver, and that in each instance the engagement is throughout substantially the full extent of the hub, although for special purposes the extent might be limited to less than the length of the hub. This construction renders the clutch very compact, and permits its use in very limited space. The structure is not dependent on any one point of engagement with the hub, nor any number of definite points, but may be engaged with the hub at any point of the rotation. The clutch features are further capable of being fitted to any existing pulley or gear.

From the above description it will be apparent that there is thus produced a device of the character described, possessing the particular features of advantage before enumerated as desirable, but which obviously is susceptible of modification, in its form, proportion, detail construction, and arrangement of parts without departing from the principle involved or sacrificing any of its advantages.

Having thus described my invention, I claim:

1. In a friction clutch, the combination, with driving and driven members, one of said members having a hub, and a journal, forming the sole support for said hub, comprising a sleeve having a longitudinal slot therein, of an expanding-rod rotatably supported in said slot, and means for rocking said rod about its longitudinal axis, thereby causing said rod to engage the adjacent edges of said sleeve and expand said sleeve into frictional engagement with said hub.

2. In a friction clutch, the combination, with driving and driven members, one of said members having a hub, and a journal, forming the sole support for said hub, comprising a sleeve having a longitudinal slot therein, of an expanding-rod rotatably supported in said slot, bearings for said rod at the opposite ends of said slot, and means for rocking said rod about its longitudinal axis, thereby causing said rod to engage the adjacent edges of said sleeve and expand said sleeve into frictional engagement with said hub.

3. In a frictional clutch, the combination, with driving and driven members, one of said members having a hub, and a journal, forming the sole support for said hub, comprising a sleeve having a longitudinal slot therein, of an expanding-rod rotatably supported in said slot, bearings for said rod at the opposite ends of said slot, a rock arm carried by said rod beyond one of said bearings, and a member having an inclined surface slidably mounted near one end of said rod and adapted to engage said rock arm and move said rod about its longitudinal axis.

4. In a friction clutch, the combination, with a shaft, a sleeve mounted on said shaft and having a longitudinal slot, a hub mounted solely upon said sleeve and rotatable relatively to said shaft, and bearings arranged at the opposite ends of said sleeve, of an expanding-rod journaled in said bearings and supported within said slot, and means for moving said rod about its longitudinal axis.

5. In a friction clutch, the combination, with a shaft, a sleeve mounted on said shaft and having a longitudinal slot, a hub mounted solely upon said sleeve and rotatable relatively to said shaft, and bearings arranged at the opposite ends of said sleeve, of an expanding-rod journaled in said bearings and supported within said slot, said rod extending beyond one of said bearings and having that portion extending beyond said bearing bent at an angle to the body portion thereof to form a rock arm, and a cone slidably mounted on said shaft and adapted to actuate said rock arm to move said expanding rod about its longitudinal axis.

6. In a friction clutch, the combination, with a shaft, a hub encircling said shaft, a split sleeve interposed between said hub and said shaft and forming a journal for said hub, and collars secured to said shaft at the opposite ends of said sleeve and having bearing apertures therein, of an expanding-rod journaled in said bearing apertures and supported between the adjacent edges of said split sleeve, and means for oscillating said rod to expand said split sleeve into engagement with said hub.

7. In a friction clutch, the combination, with a shaft, a hub encircling said shaft, and a sleeve interposed between said shaft and said hub, said sleeve having parallel circumferential slots extending about a portion of its circumference, and a longitudinal slot connecting said circumferential slots at points between their ends, of an expanding-rod journaled in those portions of said sleeve lying outside of said circumferential slots and extending through said longitudinal slot, and means for moving said expanding-rod about its longitudinal axis.

8. In a friction clutch, the combination, with a shaft, a sleeve mounted on said shaft and having a longitudinal slot, a hub supported upon said sleeve and rotatable relatively to said shaft, bearings arranged at the opposite ends of said sleeve, an expanding-rod journaled in said bearings, and means for actuating said rod, of a resilient member rigidly secured at one end to said expanding-rod and rigidly connected at the other end to said sleeve.

In testimony whereof, I have hereunto set my hand this 30th day of March A. D. 1908.

AMOS LINT.

Witnesses:
HARRY F. NOLAN,
FRANK L. WALKER.